United States Patent
Johnson et al.

(10) Patent No.: US 6,500,898 B2
(45) Date of Patent: Dec. 31, 2002

(54) DISPERSANTS PREPARED FROM HIGH POLYDISPERSITY OLEFIN POLYMERS

(75) Inventors: John R. Johnson, Euclid, OH (US); James D. Burrington, Mayfield Village, OH (US); Christopher J. Kolp, Richmond Heights, OH (US); John K. Pudelski, Cleveland Heights, OH (US); Jeffry G. Dietz, University Heights, OH (US); Gregory R. McCullough, Seabrook, TX (US); Charles K. Baumanis, Geneva, OH (US); Carlos L. Cerda de Groote, Lakewood, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/119,873

(22) Filed: Apr. 10, 2002

(65) Prior Publication Data

US 2002/0161124 A1 Oct. 31, 2002

Related U.S. Application Data

(62) Division of application No. 09/573,602, filed on May 18, 2000, now Pat. No. 6,407,170.

(60) Provisional application No. 60/140,969, filed on Jun. 24, 1999.

(51) Int. Cl.$^7$ .............................. C08F 10/10; C08F 4/22
(52) U.S. Cl. ..................... 525/178; 525/191; 525/213; 525/215; 525/216; 525/222; 525/224; 525/240; 525/241; 525/374; 525/379; 525/384
(58) Field of Search ................................. 525/178, 374, 525/379, 384, 191, 213, 215, 216, 222, 224, 240, 241

(56) References Cited

U.S. PATENT DOCUMENTS 6,107,258 A * 8/2000 Esche et al. ................. 508/231
6,346,585 B1 * 2/2002 Johnson et al. ............. 502/210

\* cited by examiner

Primary Examiner—Nathan M. Nutter
(74) Attorney, Agent, or Firm—David M. Shold; Michael F. Esposito

(57) ABSTRACT

A dispersant is prepared from an amine and a hydrocarbyl-substituted acylating agent, wherein the hydrocarbyl substituent is a polymerized olefin having a polydispersity $\bar{M}_w/\bar{M}_n$ of greater than 5. Such polyolefin substituents are prepared by polymerization of olefins in the presence of a calcined catalyst comprising a partially or fully neutralized ammonium salt of a heteropolyacid.

7 Claims, No Drawings

DISPERSANTS PREPARED FROM HIGH POLYDISPERSITY OLEFIN POLYMERS

This is a divisional of application Ser. No. 09/573,602 and now U.S. Pat. No. 6,407,170.

This application claims priority from U.S. Provisional Application Serial No. 60/140,969, filed Jun. 24, 1999.

BACKGROUND OF THE INVENTION

The present invention provides dispersants prepared from high polydispersity olefin polymers, which exhibit improved thickening properties especially in lubricant formulations. The invention also encompasses the intermediate acylating agents which react with amines to form such dispersants, as well as a process for preparing the same.

Dispersants are well known materials useful in a variety of applications, including especially lubricants for internal combustion engines. U.S. Pat. No. 4,234,435, Meinhardt et al., Nov. 18, 1980, discloses carboxylic acid acylating agents derived from polyalkenes and a dibasic, carboxylic reactant such as maleic or fumaric acid or certain derivatives thereof. The acylating agents can be reacted with a further reactant subject to being acylated such as polyethylene polyamines and polyols to produce derivatives useful as lubricant additives.

Polyolefins have been prepared by polymerization catalyzed with heteropolyacids. U.S. Pat. No. 5,710,225, Johnson et al., Jan. 20, 1998, discloses a method for producing polymers by polymerization of olefins, by contacting a $C_2$–$C_{30}$ olefin or derivative thereof with a heteropolyacid. The heteropolyacid catalyst can be a partially or fully exchanged with cations from the elements in groups IA, IIA and IIIA of the periodic chart, Group IB–VIIB elements and Group VIII metals, including manganese, iron, cobalt, nickel, copper, silver, zinc, boron, aluminum, bismuth, or ammonium or hydrocarbyl-substituted ammonium salt. The heteropolyacids can be used in their initial hydrated form or they can be treated (calcined) to remove some or all of the water of hydration. The calcining is preferably conducted in air at a temperature of, for instance, up to 375° C.; temperatures much over 350° C. do not generally provide much advantage. In the resulting polymers, the combined terminal vinylidene and β-isomer content is preferably at least 30%.

U.S. Pat. No. 5,614,480, Salomon et al, Mar. 25, 1997, discloses lubricating compositions and concentrates which include carboxylic derivatives produced by reacting a substituted succinic acylating agent containing at least about 50 carbon atoms in the substituent, with certain amines. The substituent can be a polyalkene having an $\overline{M}_n$ value of 1300 to about 5000 and an $\overline{M}_w/\overline{M}_n$ value of about 1.5 to about 4.5.

It is believed to be desirable to use highly reactive polyolefins to prepare hydrocarbyl-substituted acylating agents (e.g., anhydrides) by way of a thermal route rather than a chlorine catalyzed route. The thermal route avoids products containing chlorine. The reactivity of the polyolefin is believed to be related to the end group in the polymer with terminal olefins (terminal vinylidene) and terminal groups capable of being isomerized thereto being identified as the reactive species. The groups capable of being isomerized to the terminal vinylidene (I) group are the β-isomers (II) of Table 1.

The thermal route to substituted succinic anhydrides using highly reactive PIB's has been discussed in detail in U.S. Pat. Nos. 5,071,919, 5,137,978, 5,137,980 and 5,241,003, all issued to Ethyl Petroleum Additives, Inc.

The isomer content of a conventional ($AlCl_3$) and high terminal vinylidene polyisobutylenes (PIB's) are shown in Table 1. Conventional PIB has terminal vinylidene content of roughly 5%. The terminal isomer groups of conventional PIB and high vinylidene PIB are given below in Table 1 and those published in EPO 0355 895. However, in this invention polyisobutylene containing relatively high content of vinylidene and β-isomers can be formed. Such materials can contain at least 30 percent terminal vinylidene (I) and β-isomer (II) groups, as shown below. In preferred cases the polyisobutylene can contain at least 30 percent terminal vinylidene (I) groups, and more preferably at least 60 percent terminal vinylidene groups.

TABLE 1

| PIB Terminal Groups | Percent in Conventional PIB |
|---|---|
| $CH_3 \quad CH_3$<br>—C—$CH_2$—C=$CH_2$<br>$CH_3$<br>I Vinylidene (α-olefin) | 4–5% |
| $CH_3 \quad CH_3$<br>—C—CH=C<br>$CH_3 \quad CH_3$<br>II β-Isomer (of vinylidene) | 63–67% |
| $CH_3$<br>—$CH_2$—C=CH—$CH_3$<br>III Tri-substituted | 22–28% |
| $CH_3 \quad CH_3 \quad CH_3$<br>—CH—C=C<br>$CH_3$<br>IV Tetra-sustituted | |
| $CH_3 \quad CH_3 \quad CH_3$<br>—C=C—CH<br>$CH_3$<br>IVA | 5–8% |
| $CH_2$<br>—$CH_2$—C—$CH_2$—<br>V | |
| Other | 0–10% |

Conventional PIBs are commercially available under various tradenames including Parapol® from Exxon, Lubrizol® 3104 and 3108 from Lubrizol, Indopol® from Amoco, and Hyvis® from BP. Conventional PIBs have number average molecular weight in the range of 300–5000, but the preferred number average molecular weight is in the range of 500–2000.

SUMMARY OF THE INVENTION

The present invention provides a dispersant which is the reaction product of an amine, an alcohol, or mixtures thereof, and a hydrocarbyl-substituted acylating agent, wherein the hydrocarbyl-substituent comprises at least one polymerized olefin, the resulting polyolefin having $\overline{M}_w/\overline{M}_n$ of greater than 4 or 5, preferably 6 or 7.5 to 20. The polyolefin preferably has $\overline{M}_n$ of at least 1500, and preferably at least 30% terminal vinylidene (I) groups.

The invention further provides a dispersant above wherein the polyolefin is prepared by contacting (a) at least one $C_2$–$C_{30}$ olefin or polymerizable derivatives thereof with (b) a catalyst comprising a partially or fully neutralized ammonium salt of a heteropolyacid, wherein said catalyst has been calcined, preferably at above 350° C. to 500° C.

The present invention further provides a method for preparing a dispersant, comprising the steps of reacting a hydrocarbyl-substituted acylating agent, wherein the hydrocarbyl group is a polyolefin having $\overline{M}_w/\overline{M}_n$ of greater than 5, with an amine.

The present invention further provides a hydrocarbyl-substituted acylating agent, wherein the hydrocarbyl group is a polyolefin as described above.

DETAILED DESCRIPTION OF THE INVENTION

The dispersants of the present invention include acylated amines, that is, a reaction product of one or more hydrocarbyl substituted acylating agents, particularly hydrocarbyl-substituted carboxylic acylating agents, and one or more amines characterized by the presence within its structure of at least one >N—H group. The acylated amines are prepared in a well-known manner by reacting normally a stoichiometric excess of amine with a hydrocarbyl-substituted carboxylic acylating agent. That is, preferably greater than 1 equivalent of amine is reacted with each equivalent of carboxylic acid of the acylating agent. In certain preferred embodiments, at least 1.2 or 1.4 equivalents, and up to 8, preferably 7, 6, or 4 equivalents of amine are reacted with each equivalent of carboxylic group of the acylating agent. In another preferred embodiment, 1.0 to 1.5 equivalents of amine are reacted with each equivalent of carboxylic acid of the acylating agent.

The acylating agents used to prepare the dispersants are hydrocarbyl-substituted acylating agents. The hydrocarbyl group is substantially a polyolefin, with polydispersity and other features as described below; generally it has a number average molecular weight of at least 600, 700, or 800, to 5000, 3000, 2500, 1600, 1300, or 1200. The hydrocarbyl group is typically derived from a polyalkene, including homopolymers and interpolymers of olefin monomers having 2 to 16, to 6, or to 4 carbon atoms, and mixtures thereof. In a preferred embodiment the polyalkene is polyisobutene. Such polyalkenes are prepared by the methods set forth in greater detail in the present invention.

Suitable olefin polymer hydrocarbyl groups, having suitable polydispersity, can be prepared by heteropolyacid catalyzed polymerization of olefins under certain conditions. Preparation of polyolefins under such conditions is also described in copending U.S. application No. 09/344,129 filed Jun. 24, 1999.

Heteropolyacids are well known materials. Such catalysts can exist as the free acid or as a salt of a heteropolyanion. Heteropolyanions are polymeric oxoanions formed by a condensation reaction of two or more different oxoanions, e.g.,

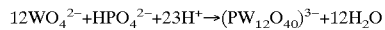

A variety of structures are known for these materials; they can have, for instance, the so-called Keggin structure, wherein twelve $WO_6$ octahedra surround a central $PO_4$ tetrahedron (in the case where phosphorus is employed). Other structures and related formulas are also known, including $PW_{12}O_{42}$, $PW_{18}O_{62}$, $P_2W_5O_{23}$, $PW_9O_{32}$, $PW_6O_{24}$, $P_2W_{18}O_{62}$, $PW_{11}O_{39}$, and $P_2W_{17}O_{61}$, where P and W are taken as representative elements and the indicated structure is an ion with the appropriate charge. The central atom of the Keggin structure, which is typically phosphorus, as shown, can also be any of the Group IIIA to Group VIIA (ACS numbering) metalloids or non-transition metals, including P, As, Si, Ge, B, Al, Sb, and Te. The tungsten (W) in the above formula fills the role known as the "poly atom," which can be any of the Group VB or VIB transition metals, including W, V, Cr, Nb, Mo, or Ta. Thus suitable materials include preferably phosphomolybdates, phosphotungstates, silicomolybdates, and silicotungstates. Other combinations selected from among the above elements are also possible, including borotungstates, titanotungstates, stannotungstates, arsenomolybdates, teluromolybdates, aluminomolybdates, and phosphovanadyltungstates, the latter representing a mixed material having a formula (for the anion portion) of $PW_{11}VO_{40}$. The preferred material is a phosphotungstate, which term generally encompasses both the acid and the various salts, described below.

The heteropoly catalysts are active both as their acid form, in which the anion is associated with the corresponding number of hydrogen ions, in the fully salt form, in which the hydrogen ions have been replaced by other cations such as metal ions, or in the partially exchanged salt form, in which a portion of the hydrogen ions have been thus replaced. For more detailed information on the structures of heteropoly catalysts, attention is directed to Misono, "Heterogeneous Catalysis by Heteropoly Compounds of Molybdenum and Tungsten," *Catal. Rev.—Sci. Eng.*, 29(2&3), 269–321 (1987), in particular, pages 270–27 and 278–280. In the present invention, the hydrogen ions have been partially or fully replaced by ammonium, that is the catalyst is a partially or fully neutralized ammonium salt of a heteropolyacid. Moreover, the catalyst has been calcined at above 350° C. to 500° C.

Heteropoly acids are commercially available materials, (e.g., Aldrich Chemical Company, #22,420-0). The salts are similarly commercially available, including most notably ammonium and cesium salts. Alternatively, they can be prepared from the acid materials by neutralization with an appropriate amount of base. Heteropoly acids are generally received in a hydrated form. They can be successfully employed in this form (uncalcined) or as in the present invention, they can be treated (calcined) to remove some or all of the water of hydration, that is, to provide a dehydrated or otherwise modified species, which in the context of the present invention exhibits improved reactivity. Calcining can be conducted by simply heating the hydrated material to a suitable temperature to drive off the desired amount of water. The heating can be under ambient pressure or reduced pressure, or it can be under a flow of air or an inert gas such as nitrogen. The use of air ensures that the acid is in a high oxidation state. The flow of air can be across the surface of the catalyst, or for greater efficiency, it can be through the bulk of the catalyst. The length of time required for calcining is related to the equipment and scale, but in one broad embodiment the calcining can be conducted over the course of 5 minutes to 16 hours, more typically 30 minutes to 8 hours, and preferably 1 hour, 2 hours or even 3 hours, up to 4 hours. The upper limits of time are defined largely by the economics of the process; times in excess of about 5 hours do not generally provide much advantage.

The material which is calcined to prepare the catalysts useful for preparing polymers for use in the present invention is preferably an ammonium salt of $H_3PW_{12}O_{40}$. Typical ammonium salts include $(NH_4)_3PW12O_{40}$ and $(NH_4)_{2.5}H_{0.5}PW_{12}O_{40}$. Each of these materials, as well as mixtures these species, are suitable. While generally the temperature of calcining will be in the range of above 350° C. to 500° C. and preferably 375 to 475° C., the optimum conditions will depend to some extent on the particular ammonium salt which is selected. When the starting salt is $(NH_4)_3PW12O_{40}$, it has been found that relatively higher temperatures are desirable for obtaining the most active catalyst. Therefore, such material is preferably calcined at 450 to 475° C. When the starting salt is $(NH_4)_{2.5}H_{0.5}PW12O_{40}$, desirable calcining temperatures can be somewhat lower, namely, above 350 to 475° C. and preferably above 375 to 475° C. When the calcining temperature is too low, the catalysts may be largely or entirely inactive. For instance, when $(NH_4)_3PW_{12}O_{40}$ is treated at below 350° C., it is generally found to be substantially inactive to provide the polymers of the present invention. This phenomenon is not fully understood; but, without intending to limit the generality or scope of the invention, it is believed that the high temperature calcining serves to remove a portion of the ammonia from the catalyst, thereby leading to a more active species. The time and temperature of the calcining are believed to be interrelated to some extent, so that use of temperatures in the lower ranges can be more effective when the calcining is conducted for a longer period of time, and vice versa, as will be apparent to the person skilled in the art.

The catalyst can be employed as particles of the pure salt, or it can be provided on a solid support of an inert material such as alumina, silica/alumina, an aluminophosphate, a zeolite, carbon, clay, or, preferably, silica. The source of the solid silica support can be a colloidal silica, which is subsequently precipitated during the catalyst preparation, or a silica which has already been preformed into a solid material. The catalyst can be coated onto the support by well-known catalyst impregnation techniques, e.g., by applying the catalysts as a solution, followed by drying, such as by spray drying or evaporation. If a support such as silica is employed, the ratio of the active catalyst component to the silica support will preferably be in the range of 0.5:99.5 to 50:50 by weight, preferably 3:97 to 40:60 by weight, and more preferably 10:90 to 30:70 by weight.

The temperatures used for the polymerization of olefins suitable for the present invention is preferably below 20° C. and more preferably below 10° C. Preferred temperature ranges are. −30 to 20° C., more preferably −20 to 10° C. and most preferably about −5° C., which is the approximate reflux temperature of isobutylene. The polymerization can be conducted in a batch apparatus or using continuous apparatus, such as a continuous stirred tank reactor or a tubular reactor, as will be apparent to those skilled in the art. The residence time of the polymerization reaction will vary with conditions including the type of reactor. Generally suitable residence times of 5 or 10 to 60 minutes, preferably 20 to 40 minutes. The polymerization can be conducted neat but is preferably conducted in the presence of a substantially inert hydrocarbon solvent or diluent, such as isobutane, pentane, hexane, octane, decane, kerosene, or Stoddard Solvent, which will normally be removed by conventional means at the conclusion of the reaction. The reaction using the catalysts of the present invention will generally provide at least a 10% conversion under these conditions, and preferably at least 20 or 25% conversion to polymer.

The preferred polymers, useful in preparing the present dispersants, are polyisobutylenes having $\overline{M}_n$ greater than 300. For the $C_4$ isobutylene, this would correspond to an average degree of polymerization (dp) of about 5.3. The preferred $\overline{M}_n$ of polyisobutylene is at least 500 and more preferably at least 1000 or 1500, and up to 5,000, preferably in the range of 2000 to 5000. It is also generally preferred that the polymers (whether polyisobutylenes or other polyolefins) do not have an extensive low molecular weight fraction. That is, preferably they should comprise less than 10%, 5%, or 3% by weight of a fraction having a number average molecular weight of less than 350, 500, or 800 units.

Such materials are particularly useful when used in reactions to alkylate maleic anhydride and for subsequent derivatization to form the dispersants of the present invention. As well as isobutylenes, other $C_2$–$C_{30}$ olefins and derivatives thereof may be used in this invention as well as styrene and derivatives thereof, conjugated dienes such as butadiene and isoprene and non-conjugated polyenes. The reaction to produce polymers may be run with mixtures of starting olefins to form copolymers. The mole ratio of olefin substrate to catalyst in this invention ranges from 1,000:1 to 100,000 to 1.

Useful polymers produced by the process of this invention are derived from $C_2$–$C_{30}$ olefin monomers and mixtures thereof and derivatives thereof. Under this terminology, styrene and derivatives would be a $C_2$-olefin substituted by a phenyl group.

Useful olefin monomers from which the polyolefins use in the present invention can be derived are polymerizable olefin monomers characterized by the presence of one or more unsaturated double bonds (i.e., >C=C<); that is, they are monoolefinic monomers such as ethylene, propylene, butene-1, isobutylene, and octene-1 or polyolefinic monomers (usually diolefinic monomers) such as butadiene-1,3 and isoprene.

These olefin monomers are preferably polymerizable terminal olefins; that is, olefins characterized by the presence in their structure of the group —R'—CH=CH$_2$, where R' is H or a hydrocarbyl group. However, polymerizable internal olefin monomers (sometimes referred to in the patent literature as medial olefins) characterized by the presence within their structure of the group:

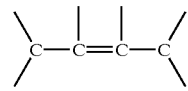

can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, for example, pentadiene-1,3 (i.e., piperylene) is deemed to be a terminal olefin for purposes of this invention.

While the polyalkenes used in the present invention generally are hydrocarbon polyalkenes, they can contain substituted hydrocarbon groups such as lower alkoxy, and carbonyl, provided the non-hydrocarbon moieties do not substantially interfere with the functionalization reactions of this invention. Preferably, such substituted hydrocarbon groups normally will not contribute more than 10% by weight of the total weight of the polyalkenes. Since the polyalkene can contain such non-hydrocarbon substituents, it is apparent that the olefin monomers from which the polyalkenes are made can also contain such substituents. Normally, however, as a matter of practicality and expense, the olefin monomers and the polyalkenes will be free from non-hydrocarbon groups—(as used herein, the term "lower" when used with a chemical group such as in "lower alkyl" or "lower alkoxy" is intended to describe groups having up to seven carbon atoms.)

Although the polyolefins useful in the invention may include aromatic groups (especially phenyl groups and lower alkyl- and/or lower alkoxy-substituted phenyl groups such as para-(tert-butyl)phenyl) and cycloaliphatic groups such as would be obtained from polymerizable cyclic olefins or cycloaliphatic substituted-polymerizable acrylic olefins, the polyalkenes usually will be free from such groups. Again, because aromatic and cycloaliphatic groups can be present, the olefin monomers from which the polyalkenes are prepared can contain aromatic and cycloaliphatic groups.

There is a general preference for polyalkenes which are derived from the group consisting of homopolymers and interpolymers of terminal hydrogen olefins of 2 to 16 carbon atoms. A more preferred class of polyalkenes are those selected from the group consisting of homopolymers and interpolymers of terminal olefins of 2 to 6 carbon atoms, more preferably 2 to 4 carbon atoms.

Specific examples of terminal and internal olefin monomers which can be used to prepare the polyalkenes of this invention include propylene; butene-1; butene-2; isobutylene; pentene-1; hexene-1; heptene-1; octene-1; nonene-1; decene-1; pentene-2; propylene-tetramer; diisobutylene; isobutylene trimer; butadiene-1,2; butadiene-1,3; pentadiene-1,2; pentadiene-1,3; isoprene; hexadiene-1,5; 2-chloro-butadiene-1,2; 2-methyl-heptene-1; 3-cyclohexyl-butene-1; 2-methyl-5-propyl-hexene-1; pentene-3; octene-4; 3,3-dimethyl-pentene-1; styrene; 2,4-dichlorostyrene; divinylbenzene; vinyl acetate; allyl alcohol; 1-methyl-vinyl acetate; ethyl vinyl ether; and methyl vinyl ketone. Of these, the hydrocarbon polymerizable monomers are preferred and of these hydrocarbon monomers, the terminal olefin monomers are particularly preferred.

Useful polymers formed in this invention include alpha-olefin homopolymers and interpolymers, and ethylene/alpha-olefin copolymers and terpolymers. Specific examples of polyalkenes include polypropylene, polybutene, ethylene-propylene copolymer, ethylene-butene copolymer, propylene-butene copolymer, styrene-isobutylene copolymer, isobutylene-butadiene-1,3 copolymer, propene-isoprene copolymer, isobutylenechloroprene copolymer, isobutylene-(para-methyl)styrene copolymer, copolymer of hexene-1 with hexadiene-1,3, copolymer of octene-1, copolymer of 3,3-dimethyl-pentene-1 with hexene-1, and terpolymer of isobutylene, styrene and piperylene. More specific examples of such interpolymers include copolymer of 95% (by weight) of isobutylene with 5% (by weight) of styrene; terpolymer of 98% of isobutylene with 1% of piperylene and 1% of chloroprene; terpolymer of 95% of isobutylene with 2% of butene-1 and 3% of hexene-1; terpolymer of 60% of isobutylene with 20% of pentene-1; and 20% of octene-1; terpolymer of 90% of isobutylene with 2% of cyclohexene and 8% of propylene; and copolymer of 80% of ethylene and 20% of propylene. U.S. Pat. No. 5,334,775 describes polyolefin based polymers of many types and their monomer precursors and is herein incorporated by reference for such disclosure.

Relative amounts of end units in conventional and high vinylidene polyisobutylenes can be determined from $^1$H NMR spectra made using a Burker AMX 500 MHz instrument and UXNMRP software to work up the spectra. $CDCl_3$ is used as the solvent with a sample concentration of approximately 0.10 g of sample dissolved in 1.5 g solvent with tetramethylsilane (1%) added as a reference. Band assignments in the NMR for the various isomers as parts per million (ppm) downfield shift from tetramethylsilane are: terminal vinylidene 4.68 and 4.89, β-isomer 5.18, tri-substituted 5.17 and 5.35, tetra 2.88.

The molecular weight of the polymers are typically determined by GPC on a Waters™ 2000 instrument run with tetrahydrofuran solvent (mobil phase). A series of 13 narrow molecular weight samples of polystyrene (m.w. 162 to 2,180,000) are preferably used as calibration standards, although known polyisobutylene can also be used as a standard. $\overline{M}_n$ (number average molecular weight) and $\overline{M}_w$ (weight average molecular weight) are determined from comparative elution volume data. Molecular weight values of the polymers produced by the method of this invention will vary according to their degree of polymerization (dp). The dp range for products of this invention typically range from 6 to 350 or even higher.

The polydispersity of the products useful in this invention as determined by the ratio of $\overline{M}_w/\overline{M}_n$ have a value of at least 4 or 5 (polystyrene standard), and may have a value of up to 20 depending upon reaction conditions. At any given reaction temperature, the $\overline{M}_w/\overline{M}_n$ is controlled by the chemical nature of the catalyst as well as the contact time of the olefin with the catalyst and the concentration of the olefin during the reaction. Use of the calcined ammonium catalysts of the present invention in the polymerization of isobutylene leads to polyisobutylene having a polydispersity typically greater than 4, or 5, or 6, often 7.5 to 20, more commonly 8 to 19 or 18. The polymers of suitable polydispersity are preferably prepared directly, from a single polymerization reaction, as opposed to by blending of different batches prepared from separate polymerization reactions. Of course, it is possible to blend different batches for convenience, each having suitably large polydispersity, to arrive at a composite material having a similarly large polydispersity.

It is also permitted to prepare polymeric mixtures of high polydispersity by physical admixture of samples of polymers of significantly different molecular weights, each sample individually having a relatively small value for $\overline{M}_w/\overline{M}_n$, that is, 4 or 5 or less. Such blending may produce polymeric mixtures which are polymodal (including bimodal) or otherwise non-uniform in their molecular weight distribution. Such materials may nevertheless exhibit advantages when used to prepare dispersants.

The hydrocarbyl-substituted carboxylic acylating agents of the present invention are prepared by the reaction of one or more of the above-described polyalkenes with one or more unsaturated carboxylic reagents. The unsaturated carboxylic reagents include unsaturated carboxylic acids per se and functional derivatives thereof, such as anhydrides, esters, amides, imides, salts, acyl halides, and nitriles. The unsaturated carboxylic reagents include mono-, di-, tri, or tetracarboxylic acids. Examples of useful unsaturated monobasic acids include acrylic acid, methacrylic acid, cinnamic acid, crotonic acid, and 2-phenylpropenoic acid. Polybasic unsaturated carboxylic acids include maleic acid, fumaric acid, mesaconic acid, itaconic acid, and citraconic acid; their anhydrides are preferred and maleic anhydride is particularly preferred. Reactive equivalents of such anhydrides include the above-mentioned derivative, e.g., acids, esters, half esters, amides, imides, salts, acyl halides, and nitriles, which can also serve as acylating agents. Another suitable acid is glyoxylic acid, which can be reacted with the polymer as described in U.S. Pat. No. 5,912,213. Reactive equivalents of glyoxylic acid, including esters and lactones, as well as other materials described in the foregoing U.S. patent, can also be used.

The acylating agents can be prepared by reacting one or more of the polyalkenes with, typically, a stoichiometric excess of a carboxylic acylating reagent such as maleic anhydride. Such reaction provides a substituted carboxylic acylating agent wherein the number of succinic groups, for each equivalent weight of the hydrocarbyl group, is at least 1.3, preferably at least 1.4 or 1.5, and typically up to 5, 4.5, or 3.5. That is, such acylating agents is characterized by the presence of at least 1.3 succinic groups for each equivalent weight of substituent group. For purposes of this calculation, the number of equivalent weight of substituent groups is; deemed to be the number corresponding to the quotient obtained by dividing the $\overline{M}_n$, (number average molecular weight) value of the polyalkene from which the substituent is derived into the total. weight of the substituent groups present in the substituted succinic acylating agent. Thus, if a substituted succinic acylating agent is characterized by a total weight of substituent group of 40,000 and the $\overline{M}_n$ value for the polyalkene from which the substituent groups are derived is 2000, then that substituted succinic acylating agent is characterized by a total of 20 (40,000/2000=20) equivalent weights of substituent groups. Therefore, that particular succinic acylating agent would also be characterized by the presence within its structure of at least 26 succinic groups.

It is also possible that the acylating agent can be prepared in such a way that the number of succinic groups for each equivalent of the hydrocarbyl group is less than 1.3.

The presence of succinic groups at the above-specified levels, and the above-specified $\overline{M}_w/\overline{M}_n$ ratios are believed to result in improved performance of the resulting dispersant. These features, and methods for preparing succinic acylating agents satisfying these parameters, except for the use of the materials of the high polydispersity, are described in U.S. Pat. No. 4,234,435. In particular, this patent discloses (in column 19) a process for preparing such materials by heating at a temperature of about 160° C. to about 220° C. a mixture comprising:

(A) Polybutene characterized by a $\overline{M}_n$ value of about 1700 to about 2400, in which at least 50% of the total units derived from butenes is derived from isobutene, (B) One or more acidic reactants of the formula

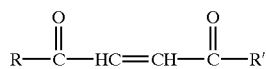

wherein R and R' are each —OH or when taken together, R and R' are —O—, and (C) Chlorine.

Specific examples of preparation of such acylating agents are set forth in Examples 1 through 9 of U.S. Pat. No. 4,234,435. Similar examples can be found in U.S. Pat. Nos. 3,215,707, 3,219,666, and 3,231,587.

Other processes can be used, if desired, which do not employ chlorine, and this is often preferred if the presence of chlorine is undesirable for environmental reasons. Bromine can be used in place of chlorine; or the reactants can be heated together at 150 to 200 or 230° C. in the absence of halogen. Preparation using a so-called "thermal" route is generally described in European Patent 355,895.

In the formation of the hydrocarbyl-substituted acylating agent, the conditions for the reaction of the olefin polymer with the acylating reagent such as maleic anhydride, and the relative concentrations of such components, should preferably be sufficient that a majority of the olefin polymer has reacted with at least one molecule of the acylating reagent.

That is, it is preferred, for optimum performance of the dispersant, that no more than 30 percent by weight polyisobutene or other olefin polymer should remain unreacted in the resulting acylating agent and, subsequently, in the resulting dispersant. Preferably no more than 25 percent unreacted polymer should remain, and more preferably no more than 20 percent. Determination of conditions to assure a sufficient degree of reaction is within the abilities of the person skilled in the art.

Dispersants are prepared by reacting the hydrocarbyl-substituted acylating agent with an amine, an alcohol, or mixtures thereof. The amines used to prepare the dispersants can be polyamines as disclosed in U.S. Pat. No. 4,234,435 at column 21, line 4 to column 27, line 50. They may also be heterocyclic polyamines or alkylenepolyamines. Alkylenepolyamines are represented by the formula $H(R^1)N-(Alkylene-N(R^1))_n R^1$, where each $R^1$ is independently hydrogen or an aliphatic group or a hydroxy-substituted aliphatic group; n is 1 to 10, 2 to 7, or 2 to 5, and the "Alkylene" group has 1 to 10, or 2 to 6, or 2 to 4 carbon atoms. Specific examples of such polyamines are the ethyleneamines and polyethyleneamines, such as ethylenediamine, triethylenetetramine, triethylenetetramine, tetraethylenepentamine, pentaethylenehexamine and mixtures thereof, including complex commercial mixtures which include cyclic condensation products. Such materials are described in detail under the heading "Ethylene Amines" in Kirk Othmer's *Encyclopedia of Chemical Technology*, 2d Edition, Vol. 7, pages 22–37, Interscience Publishers, New York, 1965. Other amine mixtures include "polyamine bottoms" which is the residue resulting from stripping of the above-described polyamine mixture. In another embodiment, the polyamine can be a condensed polyamine resulting form the condensation reaction of at least one hydroxy compound with at least one polyamine reactant containing at least one primary or secondary amino group. Such condensates are described in U.S. Pat. No. 5,230,714. Similarly, amines can be amino alcohols of any of a variety of well-known types.

Alcohols can be used in preparation of the dispersants of the present invention. Such dispersants generally then contain ester groups. Suitable alcohols can be aliphatic, cycloaliphatic, aromatic, or heterocyclic, alcohols and can contain non-hydrocarbon substituents of a type which do not interfere with the reaction of the alcohols with the acylating agent to form the ester. The alcohols can be monohydric alcohols such as methanol, ethanol, isooctanol, dodecanol, and cyclohexanol, although they are preferably polyhydric alcohols, such as alkylene polyols. Preferably, such polyhydric alcohols contain 2 to 40 and more preferably 2 to 20 carbon atoms; and 2 to 10 hydroxyl groups, more preferably 2 to 6. Polyhydric alcohols include ethylene glycols such as di-, tri- and tetraethylene glycols; propylene glycols; glycerol; sorbitol; cyclohexane diol; erythritol; and pentaerythritols, including di- and tripentaerythritol.

Commercially available polyoxyalkylene alcohol demulsifiers can also be employed as the alcohol component. Such materials include the reaction products of various organic amines, carboxylic acid amides, and quaternary ammonium salts with ethylene oxide. Some such materials are available under the names Ethoduomeen T™, an ethylene oxide condensation product of an N-alkyl alkylenediamine; Ethomeen™, ethylene oxide condensation products of primary fatty amines; Ethomids™, ethyene oxide condensates of fatty acid amides, and Ethoquads™, polyoxyethylated quaternary ammonium salts such as quaternary ammonium chlorides.

Examples of preparation of the dispersants (apart from use of the present polyolefins of high polydispersity) are found in U.S. Pat. No. 4,234,435, in particular, Examples 10 through 41 therein. For additional examples, reference may be made to U.S. Pat. Nos. 3,215,707 and 3,219,666.

The dispersants of the present invention can be further borated or treated with metallizing agents, Boration of the dispersant can be effected by well-known techniques, in particular, by reaction of the dispersant with one or more boron compounds. Suitable boron compounds include boric acid, borate esters, and alkali or mixed alkali metal and alkaline earth metal borates. These metal borates are generally a hydrated particulate metal borate and they, as well as the other borating agents, are known in the art and are available commercially. Typically the dispersant is heated with boric acid at 50–100° C. or 100–150° C. In a similar way, the dispersants can be metallized or treated with reactive metal containing compounds, such as zinc compounds.

EXAMPLES

Measurements of molecular weight and polydispersity are made as described above using polystyrene standards, unless otherwise noted. In some cases (indicated with the notation "PBu std"), molecular weight is measured using a different model instrument against a standard broad molecular weight distribution polyisobutylene sample, which in turn is standardized by comparison with a series of narrow molecular weight distribution polyisobutylene standards. For some specimens for which the polystyrene and PBu standards have been compared, the values for $\overline{M}_n$ using the PBu standard tend to be roughly 0.7 to 0.8 times those obtained using the polystyrene standard, and the values obtained for $\overline{M}_w/\overline{M}_n$ tend to be roughly 1.4 to 1.6 times those obtained using the polystyrene standard.

Example 1

Catalyst Preparation

In a fume hood, a solution of 3.78 g (0.0394 moles) of $(NH_4)_2CO_3$ in water (30 mL) is added dropwise to a solution of 100 g (0.0315 moles, containing 9.23% water) $H_3PW_{12}O_{40}$ in water (120 mL), resulting in a milky-white slurry. The water is evaporated by heating or by spray drying to isolate the solid ammonium salt $(NH_4)_{2.5}$ catalyst. The catalyst is calcined under air flow in a glass tube mounted in an oven at 450° C. for 2 hours or for other times and temperatures indicated hereafter.

Example 2

Polymerization (Reference)

A 500 mL 3-necked round bottom flask is charged with 100 mL cyclohexane which is stirred under a nitrogen atmosphere for 60 minutes. To the flask is added 0.50 g of $(NH_4)_{2.5}H_{0.5}PW_{12}O_{40}$ catalyst, prepared as in Example 1 but calcined at 350° C. for 180 minutes. The flask, while continuously maintaining a nitrogen atmosphere, is fitted with a cold finger on a jacketed addition funnel, a nitrogen inlet, and a thermometer. Isobutylene (59 g) is condensed into the addition funnel and is added to the vessel with stirring at 0° C. to 7° C. After 30 minutes of stirring, methanol is added to the vessel by a syringe in order to quench the catalyst. The liquid, containing the product polymer, is decanted off the solid particles and the volatiles are removed under reduced pressure from the liquid portion to provide 7.3 g of an oil (12.4% yield) having a $\overline{M}_n$ of 2253 and $\overline{M}_w/\overline{M}_n$ of 8.00 (or 1699 and 11.94, respectively, PBu std.)

Example 3

Polymerization

In a 1000 mL 4-necked round bottom flask, fitted with a cold finger on a jacketed addition funnel, a nitrogen inlet, a monomer inlet, and a thermometer is established a nitrogen atmosphere. To the flask is added 100 mL hexane, which is stirred for 30 minutes. Thereupon, 0.20 g of $(NH_4)_{2.5}H_{0.5}PW_{12}O_{40}$ catalyst, prepared as in Example 1, is added to the vessel. Isobutylene, 59 g is condensed into the addition funnel and added to the vessel. The temperature is maintained at −6° C. to 9° C. After 30 minutes of stirring, 10 mL water is injected into the mixture to deactivate the catalyst. The organic liquid phase is removed by decantation and is concentrated under reduced pressure to provide 14.5 g of an oil (25% yield) having a $\overline{M}_n$ of 2571, a $\overline{M}_w/\overline{M}_n$ of 7.98 (or 1810 and 13.41, respectively, PBu std.) with a vinylidene end group content of 75%.

Examples 4–9.

Using procedures similar to those set forth above, the following polymerizations of isobutylene are conducted. In the table below, n represents the number of ammonium ions in the catalyst $(NH_4)_nH_{3-n}PW_{12}O_{40}$. "n.d." means not determined.

TABLE 2

| Example | n | Calcining temp, ° C. | Calcining time, hr | Yield % | $\overline{M}_n$[b] | $\overline{M}_w/\overline{M}_n$[b] | % vinyl-idene |
|---|---|---|---|---|---|---|---|
| 4 (ref.) | 2.5 | 250 | 3 | 2.5 | 692 | 18.5 | 81 |
| 5 (ref.) | 2.5 | 350 | 3 | 28.0 | 2742 | 9.98 | 77 |
| 3 | 2.5 | 450 | 2 | 25.0 | 2149 | 11.57 | 75 |
| 6 | 2.5 | 450 | 5 | 36.0 | 2088 | 7.86 | 79 |
| 7 | 2.75[a] | 375 | 4 | 0.7 | n.d. | n.d. | n.d. |
| 8 | 3 | 375 | 3 | 0.7 | n.d. | n.d. | n.d. |
| 9 | 3 | 450 | 5 | 25.0 | 2834 | 10.5 | n.d. |

[a]prepared by adding 2.75 equivalents of $NH_4^+$ to the heteropolyacid.
[b]PBu std.

Example 10

Polymerization

A 4-necked round bottom vessel (1000 mL) is fitted with a jacketed addition funnel, a nitrogen inlet, a, dry ice condenser, and a thermometer. A nitrogen atmosphere is established in the vessel. Isobutylene (118 g) is condensed into the funnel and then added to the vessel. The $(NH_4)_{2.5}H_{0.5}PW_{12}O_{40}$ catalyst (0.5 g) is added and the reaction mixture is magnetically stirred and maintained at −5 to −6° C. for 30 minutes. Thereafter water (50 ML) is added to quench the reaction, followed by hexane (200 mL). The organic layer is separated, dried over $MgSO_4$, filtered, and concentrated under reduced pressure (6.66 kPa [50 mmHg] at 160° C.) to provide 62.6 g of a product having $\overline{M}_n$=2882, $\overline{M}_w/\overline{M}_n$=9.73 (PBu std.), and 74% terminal vinylidene groups.

Example 11

Polymerization

A 4-necked bottom-drain vessel (2000 mL) is fitted with a mechanical stirrer, a nitrogen inlet, a thermometer, a dry ice condenser, an Isco™ pump for addition of isobutylene, and a solids addition funnel containing $(NH_4)_{2.5}H_{0.5}PW_{12}O_{40}$ catalyst. A nitrogen atmosphere is established in the vessel. Isobutylene (200 mL) is added to the vessel and is allowed to reflux at −6° C. Addition of the catalyst (4.2 g over the course of 4 hours) is begun. Isobutylene (1800 mL) is added over the 4 hour reaction time. Product and monomer are removed via the bottom drain at a rate comparable to the rate of addition of monomer, to maintain a constant volume in the reactor. Isolation and characterization of the polymer during the course of the reaction indicates a material of having the following characteristics:

| Fraction | $\overline{M}_n$ | $\overline{M}_w/\overline{M}_n$ | Vinylidene Content (%) | Monomer Conversion (%) |
|---|---|---|---|---|
| A | 3351 (2542[a]) | 8.33 (12.1[a]) | 74 | 44 |
| B | 3983 (2886[a]) | 6.61 (10.4[a]) | 78 | 48 |
| C | 4311 (3171[a]) | 6.09 (9.6[a]) | 78 | 42 |
| D | 4206 (1853[a]) | 6.12 (14.0[a]) | 79 | 62 |

[a]PBu std.

The range of monomer conversion for this continuous run is 39–62%. Overall conversion of monomer to polymer over the course of reaction is 49%.

Example 12

In a fume hood, a 5000 mL, 4-neck vessel with a bottom drain is fitted with a jacketed addition funnel, a cold finger, a nitrogen inlet, an isobutylene (previously calcined), and a thermometer, all arranged such that the system can be pressure equalized. A nitrogen atmosphere is established in the vessel. Isobutylene (500 mL initial charge, 3000 mL total is added to the vessel from the jacketed addition funnel. The monomer is stirred, neat, until the temperature reaches approximately −9° C. The catalyst (2.4 g total) is added to the vessel in portions throughout the reaction. After approximately 20 minutes stirring of the initial charge of isobutylene and catalyst, dropwise addition of the remaining monomer and of the remaining catalysts is begun. After a total reaction time of 2.5 hours the vessel is drained into water, to quench the reaction. The mixture with water is stirred and the organic layer is separated, washed with water, again separated, dried with $MgSO_4$, filtered, and concentrated under vacuum to provide an oil (775 g; 46% yield, $\overline{M}_n$ 4243, $\overline{M}_w/\overline{M}_n$ 9.06 (or 3147 and 13.9, respectively, PBu std.), vinylidene end group content 80%). This sample is combined with 4 additional samples prepared by the same procedure, ranging in weight from 542 to 974 g. The total blended sample is 3980 g and has $\overline{M}_n$ 4368, $\overline{M}_w/\overline{M}_n$ 7.89 (or 3180 and 12.4, respectively, PBu std.), and vinylidene end group content 80%.

Example 13

A supported catalyst is prepared by coating $(NH_4)_{2.5}H_{0.5}PW_{12}O_{40}$ onto silica by solution treatment followed by drying. The supported catalyst is calcined at 450° C. for 3 hours.

Following the procedure listed in Example 12, isobutylene (1200 g) is reacted with 4.5 g of the above-mentioned supported catalyst over a 1 hour 45 minute time period before being quenched by a water/hexane mixture. The organic layer is separated, dried over $MgSO_4$, filtered, and concentrated under reduced pressure (6.66 kPa (50 mmHg) at 160° C.) to provide 404 g (34% yield) of product having $\overline{M}_n$ 1951, $\overline{M}_w/\overline{M}_n$ of 9.52 (or 1367 and 11.70, respectively, PBu std.) and 80% terminal vinylidene content.

Examples 14–16—Blends of High Polydispersity Polymers

Example 14

To a lab-scale continuous stirred tank reactor is charged 1100 g anhydrous hexane and 8 g catalyst as generally prepared in Example 1 (75% $(NH4)_{2.5}PW_{12}O_{40}$ on 25% $SiO_2$, by evaporation) at 0° C. When the reactor and its contents are cooled to temperature, a feed stream of isobutylene is fed to the system, initially at a low rate of 0.5 L/hr, gradually increasing over the course of ~3.5 hours to a target rate of 1.6 L/hr, which corresponds to a residence time in the reactor of 30 to 60 minutes. Pressure in the reactor is targeted at 341 kPa absolute (35 psig). During the course of reaction the isobutylene feed is partially converted to polyisobutylene along with oligomers (light ends) and is allowed to flow out of the reactor system through a catalyst containment system involving in-line filter elements. A periodic backflush is used to minimize catalyst plugging of the filter. The reactor effluent passes to a single stage flash evaporator unit which removes a portion of the unreacted isobutylene, which is recovered and recycled to the reactor. The resulting crude polymer stream is passed to a stripper which operates at 204° C. (400° F.) and 6.6 kPa (50 mmHg) pressure to produce the final product.

Example 15

The preparation of Example 14 is substantially repeated in order to provide an additional batch of similar polymer.

Example 16

The products of Examples 14 (863 g) and 15 (852 g) are combined to prepare a mixed polymer for further synthetic work. The properties of Examples 14, 15, and blend 16 are reported in Table 3.

TABLE 3

| Example | 14 | 15 | 16 |
|---|---|---|---|
| $\overline{M}_n$[d] | 1807 | 1812 | 1822 |
| $\overline{M}_w/\overline{M}_d$[d] | 15.4 | 15.1 | 15.2 |
| % terminal vinylidene (I) | 62.2 | 62.1 | 62.1 |
| % internal vinylidene (II) | 6.5 | 6.4 | 6.4 |
| % tri-substitution (III) | 27.0 | 23.9 | 25.4 |
| % tetra-substitution (IV) | 4.3 | 7.6 | 6.0 |
| 40° C. viscosity[a] | >330,000 | [b] | >330,000 |
| 100° C. viscosity[c] | 10,500 | 11,600 | 11,100 |

[a]ASTM D 445_40 ($10^6$ $m^2$/s [cSt])
[b]too viscous to measure
[c]ASTM D 445_100 ($10^6$ $m^2$/s [cSt])
[d]PBu std.

Example 17

A polymer blend is prepared by mixing two polyisobutene polymers having the molecular weights as indicated below, to provide a blend with a high polydispersity:

| Polymer | $\overline{M}_n{}^a$ | $\overline{M}_w/\overline{M}_n{}^a$ |
|---|---|---|
| A (HyVis ™ 2000 from BP) | 7275 | 4.0 |
| B (Indopol ™ L-14 from Amoco) | 350 | 1.7 |
| A + B (66:34 blend by weight) | 1230 | 18.8 |

$^a$PBu std.

Example 18

Preparation of Alkylated Acylating Agent

A mixture of 1666 g of polyisobutylene from Example 16 and 269 g maleic anhydride are heated in a reactor with stirring at 205° C. for 24 hours. At the end of the reaction time, excess unreacted maleic anhydride is removed by vacuum. The resulting crude product is diluted with 25 weight percent oil and filtered using a filter aid to yield the final oil-diluted product. The product contains 1.13 weight percent free maleic anhydride, a Total Acid Number (defined in U.S. Pat. No. 4,234,435) of 69.1 meq/g, and contains 43.4 percent by weight non-polar species, including the diluent oil.

Example 19

Preparation of Alkylated Acylating Agent

A mixture of 1465 g of polyisobutylene from Example 12 and 139 g of maleic anhydride is heated with stirring at 200° C. for 24 hours. At the end of the reaction time, excess unreacted maleic anhydride is removed by vacuum. The resulting crude product is diluted with 1473 g of diluent oil and filtered, using filter aid, to yield the oil-diluted product. The product contains 0.28 weight percent free maleic anhydride, a Total Acid Number of 24.1 meq/g, and contains 58.5 percent by weight non-polar species including diluent oil.

Example 20

Preparation of Succinimide Dispersant

The oil-diluted product of Example 18 is further diluted to a total of 50 weight percent oil. This solution (1244 g) is heated to 110° C. and to it is added 53 g polyethyleneamine bottoms (HPA-X™ from Union Carbide Corp.) over the course of 1 hour. The mixture is maintained at temperature for an additional 30 minutes, then heated to 150° C. and maintained at temperature for four hours to permit removal of water. The mixture is filtered using a filter aid to yield the final product, which exhibits a Total Acid Number of 4.00, a Total Base Number of 29.9, and a viscosity at 100° C. of $1.248 \times 10^{-3}$ m$^2$/s (1248 cSt).

Example 21

Succinimide Dispersant

A mixture of 5239 g of oil-diluted product prepared as in Example 19 is heated to 100° C. with stirring, and to it is added 108 g additional diluent oil, followed by 90.3 g of polyethyleneamine bottoms (HPA-X™) over 30 minutes. The mixture is heated to 160° C. and maintained at this temperature for 5 hours to permit removal of water. The mixture is filtered using filter aid to yield the final product, which exhibits a Total Acid Number of 1.94, a Total Base Number of 9.72, and a viscosity at 100° C. of $1.651 \times 10^{-3}$ m$^2$/s (1651 cSt).

Example 22

Ester/Amide/Imide Dispersant

A mixture of 300 g of oil-diluted product prepared similarly to Example 19; 135.4 g of additional diluent oil; and 6.1 g of monopentaerythritol; is heated to 205° C. with stirring and is maintained at this temperature for 12.5 hours. The mixture is cooled to 190° C. and 1.1 g of polyethyleneamine bottoms (HPA-X™) is added. The mixture is maintained at 190° C. for 1.5 hours and then filtered using filter aid to yield the final product, which contains 70 weight percent oil, exhibits a Total Acid Number of 0.6, a Total Base Number of 1.6, and a viscosity at 100° C. of $0.223 \times 10^{-3}$ m$^2$/s (223 cSt).

Example 23

Preparation of Formulations

A 13.0% additive concentrate is prepared by blending 7.2% of the succinimide dispersant from Example 18 with diluent oil and 5.8% of conventional additives of the following types (not corrected for amount of additional diluent oil): zinc dialkylthiophosphate, calcium overbased detergents, sulfur-containing ester, thiadiazole inhibitor, and antifoam agent. Finished blends, targeted at a 15W-40 grade, are prepared by blending the foregoing additive concentrate in formulations 19a, 19b, and 19c, as shown in Table 4. In each case shown in Table 4, base oil is a mixture of 80% 150 Neutral oil and 20% 600 Neutral oil. For comparison, a similar formulation prepared using a conventional dispersant based on a polyisobutylene of low polydispersity (2.8–3.2), prepared using a chlorine catalyzed process, is reported as "comp. 23d." Certain physical and performance properties of the compositions are also reported in Table 4.

TABLE 4

| | 23a | 23b | 23c | comp. 23d |
|---|---|---|---|---|
| Composition (%) | | | | |
| Concentrate of Ex. 23 | 13.0 | 13.0 | 13.0 | — |
| Conventional dispersant | — | — | — | 13.0 |
| Viscosity Modifier | 8.0 | 6.0 | 4.0 | 8.0 |
| Pour Point Depressant | 0.2 | 0.2 | 0.2 | 0.2 |
| Base Oil | 78.8 | 80.8 | 82.8 | 78.8 |
| Properties | | | | |
| Kinematic visc., 100° C. ($10^6$ m$^2$/s [cSt]) | 18.2 | 16.2 | 14.3 | 14.3 |
| High temp, high shear viscosity 150° C., $10^6$ sec$^{-1}$ ($10^3$ Pa · s [cP]) | 4.83 | 4.34 | 4.01 | 4.00 |
| Cold crank, −15° C. ($10^3$ Pa · s [cP]) | 2780 | 2770 | 2730 | 2630 |
| MRV, −25° C. ($10^3$ Pa · s [cP]) | 19,700 | 17,300 | 15,900 | 15,400 |

Kinematic viscosity: ASTM D-445
Hight temperture, high shear viscosity: ASTM D-4683
Cold crank: ASTM D-5293
MRV = mini rotary viscometer, ASTM D-4684

Kinematic viscosity: ASTM D-445
High temperature, high shear viscosity: ASTM D-4683
Cold crank: ASTM D-5293
MRV=mini rotary viscometer, ASTM D-4684

Example 24

A similar concentrate is prepared by blending the dispersant of Example 21 with diluent oil and conventional additives (amounts reported inclusive of diluent oils). A blended oil targeted at 5W-30 viscosity grade is prepared by blending of various base stocks and pour point depressants, but with no conventional viscosity modifier, which is formulation 24a. For comparison, a similar formulation prepared using a conventional dispersant based on polyisobutylene of low polydispersity and containing viscosity modifier is prepared (formulation comp. 24b). Certain physical and performance properties of the compositions are also reported in Table 5.

TABLE 5

|  | 24a | comp. 24b |
|---|---|---|
| Composition (%) | | |
| Dispersant of Ex. 21 | 9.8[a] | — |
| Conventional Dispersant | — | 7.0[a] |
| Overbased detergents | 3.9 | 3.9 |
| Antioxidants | 1.0 | 1.0 |
| Antiwear, antifoam, antifriction agents, pour point depressant, etc. | 1.5 | 1.5 |
| Viscosity Modifier | 0.00 | 6.3 |
| Base Oil (69% hydroisomerized 135 N + 31% 6 cSt PAO) | 83.8 | 80.3 |
| Properties | | |
| Kinematic Viscosity ($10^6$ m²/s [cSt]) | 12.1 | 11.2 |
| High temp, high shear viscosity 150° C., $10^6$ sec$^{-1}$ ($10^3$ Pa · s [cP]) | 3.80 | 3.46 |
| Cold crank, −25° C. ($10^3$ Pa · s [cP]) | 3600 | 3660 |

[a]Active dispersant chemical 4.90% by weight in the composition in each case.

The test results show that the dispersants of the present invention exhibit significant activity as Viscosity Index Modifiers. At constant amounts of added viscosity modifier (8.0%, 23a and comp. 23d), the blends containing the dispersants of the present invention show significantly greater kinematic viscosity and high temperature/high shear viscosity than does the formulation containing the conventional dispersant. These improvements are realized without a substantial degradation in cold crank or MRV low temperature performance. The improved viscosity performance permits a reduction in the amount of viscosity modifier in the blend from 8% to 4% while retaining viscometrics comparable to those of the baseline material (23c and comp. 23d). These improvements arise while the composition maintains good dispersancy. Similar results are seen in example 24a and comparative 23b. Although no conventional viscosity modifier is present in Example 24a, the presence of the dispersant of the present invention provides viscosity performance essentially equivalent to that of comparative 24b.

Example 25

A fully formulated composition is prepared using the ester/amide/imide dispersant of Example 22, and compared with similar compositions employing two conventional (low polydispersity) dispersants. The results are shown in Table 6.

TABLE 6

|  | 25a | comp. 25b | comp. 25c |
|---|---|---|---|
| Composition (%) | | | |
| Dispersant of Ex. 22 | 8.40[a] | — | — |
| Conventional dispersant A | — | 5.04[a] | — |
| Conventional dispersant B | — | — | 5.60[a] |
| Overbased detergents | 1.65 | 1.65 | 1.65 |
| Antioxidant(s) | 0.59 | 0.59 | 0.59 |

TABLE 6-continued

|  | 25a | comp. 25b | comp. 25c |
|---|---|---|---|
| Viscosity modifier(s) | 7.2 | 7.2 | 7.2 |
| Other components | 0.51 | 0.51 | 0.52 |
| Diluent Oil (additional) | 1.99 | 1.43 | |
| Properties | | | |
| Kinematic Viscosity ($10^6$ m²/s [cSt]) (ASTM D2270) | | | |
| 40° C. | 76.1 | 61.0 | 64.4 |
| 100° C. | 12.4 | 10.2 | 10.7 |
| Viscosity Index | 162 | 154 | 156 |
| High temp, high shear viscosity 150° C., $10^6$ sec$^{-1}$ ($10^3$ Pa · s [cP]) | 3.48 | 2.93 | 3.00 |
| Cold crank, −25° C. ($10^3$ Pa · s [cP]) | 3560 | 3210 | 3150 |
| MRV, −35° C. ($10^3$ Pa · s [cP]) | 29500 | 20700 | 20200 |

[a]Each dispersant contributes 2.52 percent active chemical dispersant to the composition, the remainder of the dispersant composition being diluent oil.

Reduction of the amount of added viscosity modifier can provide an economic advantage in lubricant formulations, and can also improve low temperature viscometrics, permit improvement in the base oil/volatility balance of the formulation, and improve thermal stability performance.

The dispersants of the present invention can be used in fully formulated lubricants which normally contain at least 50% oil of lubricating viscosity. The lubricants can also contain (or can exclude) other conventional additives such as those of the types mentioned above. The dispersants can also be supplied as concentrates in which a concentrate-forming (typically 50% or less) amount of oil of lubricating viscostiy is present.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include hydrocarbon substituents, substituted hydrocarbon substituents, and hetero substituents, that is, substituents which, while having a predominantly hydrocarbon character, contain other than carbon in a ring or chain otherwise composed of carbon atoms. In general, no more than two, preferably no more than one, non-hydrocarbon substituents will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, certain ions can migrate to sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing or using the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

What is claimed is:

1. A hydrocarbyl-substituted acylating agent, being the reaction product of a polyolefin with one or more unsaturated carboxylic reagents, wherein the hydrocarbyl substituent comprises the polyolefin which in turn comprises at least one polymerized olefin, the resulting polyolefin having $\overline{M}_w/\overline{M}_n$ of greater than 5 and at least about 30% terminal vinylidene (1) groups.

2. The hydrocarbyl-substituted acylating agent of claim 1 being a hydrocarbyl-substituted succinic anhydride or a reactive equivalent thereof.

3. The hydrocarbyl-substituted acylating agent of claim 1 being the reaction product of glyoxylic acid or a reactive equivalent thereof and a polymerized olefin.

4. The hydrocarbyl-substituted acylating agent of claim 1 wherein the polyolefin has $\overline{M}_w/\overline{M}_n$ of about 6 to about 20.

5. The hydrocarbyl-substituted acylating agent of claim 1 wherein the polyolefin is prepared by contacting (a) at least one $C_2$–$C_{30}$ olefin or polymerizable derivative thereof with (b) a catalyst comprising a partially or fully neutralized salt of a heteropolyacid, wherein said catalyst has been calcined.

6. The hydrocarbyl-substituted acylating agent of claim 5 wherein said heteropolyacid comprises a material represented by the formula $(NH_4)_nH_{3-n}PW_{12}O_{40}$, where n is 2.5 or where n is 3, or mixtures thereof.

7. The hydrocarbyl-substituted acylating agent of claim 1 wherein the polyolefin is prepared by blending at least two polyolefin components having different number average molecular weights, each such component having a $\overline{M}_w/\overline{M}_n$ of less than 5.

* * * * *